(12) United States Patent
Oh et al.

(10) Patent No.: US 11,768,390 B2
(45) Date of Patent: Sep. 26, 2023

(54) BLOCKER HAVING LIGHT TRANSMISSION AND REFLECTION DEVICE

(71) Applicant: HUVITZ CO., LTD., Gyeonggi-do (KR)

(72) Inventors: Dong Kun Oh, Gyeonggi-do (KR); Hyun Chul Lee, Gyeonggi-do (KR)

(73) Assignee: HUVITZ CO., LTD., Gyeonggi-Do (KR)

( * ) Notice: Subject to any disclaimer, the term of this patent is extended or adjusted under 35 U.S.C. 154(b) by 456 days.

(21) Appl. No.: 17/187,294

(22) Filed: Feb. 26, 2021

(65) Prior Publication Data

US 2021/0333574 A1    Oct. 28, 2021

(30) Foreign Application Priority Data

Apr. 27, 2020  (KR) .................. 10-2020-0050528
Feb. 3, 2021   (KR) .................. 10-2021-0015662

(51) Int. Cl.
G02C 13/00     (2006.01)
G01M 11/02     (2006.01)
G02B 26/02     (2006.01)

(52) U.S. Cl.
CPC ......... *G02C 13/003* (2013.01); *G01M 11/025* (2013.01); *G01M 11/0207* (2013.01); *G02B 26/02* (2013.01)

(58) Field of Classification Search
CPC . G02C 13/003; G02B 26/02; G01M 11/0207; G01M 11/025; B24B 13/005; B24B 9/146
See application file for complete search history.

(56) References Cited

U.S. PATENT DOCUMENTS

| 7,884,928 B2 | 2/2011 | Mizuno et al. |
| 2007/0226991 A1 | 10/2007 | Matsuyama |

FOREIGN PATENT DOCUMENTS

| EP | 1739472 A1 | 1/2007 |

OTHER PUBLICATIONS

Search Report dated Sep. 29, 2021 issued in corresponding European Application No. 21158470.1.

*Primary Examiner* — Tarifur R Chowdhury
*Assistant Examiner* — Amanda Merlino
(74) *Attorney, Agent, or Firm* — Nath, Goldberg & Meyer; Joshua B. Goldberg

(57) ABSTRACT

The blocker described comprises: a lens illumination light source; a light transmission and reflection device to reflect/transmit the light; an image sensor to detect light reflected by the light transmission and reflection device and thereby obtain an lens image; a lens meter to detect the light that has passed through the light transmission and reflection device to thereby measure lens characteristics; and a blocking member to attach a leap block to the lens. The light transmission and reflection device comprises: a first reflection plate having a central hole; a first rotating cylinder to be coupled to and to rotate the first reflection plate; a second rotating cylinder located inside and to rotate the first rotating cylinder; a second reflection plate, adjusted by the second rotating cylinder and configured to open or block the central hole in the first reflection plate; and driving means configured to drive the second rotating cylinder.

6 Claims, 5 Drawing Sheets

(A) (B)

BLOCKER HAVING LIGHT TRANSMISSION AND REFLECTION DEVICE

CROSS-REFERENCE TO RELATED APPLICATION

This application claims benefit of priority to Korean Patent Applications Nos. 10-2020-0050528 and 10-2021-0015662 filed on Apr. 27, 2020 and Feb. 3, 2021, respectively, the entire contents of which are incorporated herein by reference.

FIELD OF THE DISCLOSURE

The present invention relates to a blocker, and more particularly, to a blocker having a light transmission and reflection device used to detect the image of a lens and to measure the characteristics of the lens.

BACKGROUND

Eyeglasses are made by fitting lenses for correcting vision into an eyeglass frame selected by a consumer. In order to manufacture eyeglasses, it is necessary to machine the outer shape of blank lenses sold in a circular shape so as to conform to an eyeglass frame, and to this end, such apparatus as a tracer, a blocker, a lens machining tool, and so on is used. A tracer is an apparatus for reading the shape of an eyeglass frame, and a lens machining tool is an apparatus for machining blank lenses into the shape of the eyeglass frame. A blocker is an apparatus for attaching a leap block (or connecting block) to a machining reference point of a blank lens (See US Patent Application Publication No. 2007/0226991 A1 and U.S. Pat. No. 7,884,928). Once the leap block is attached to the blank lens, the blank lens is mounted to a clamp of the lens machining tool via the leap block, and then the blank lens is machined into the shape of the eyeglass frame.

In order to attach the leap block to a desired location in the lens, it is necessary to obtain the image of a lens showing the shape of the lens and to detect the characteristics of the lens such as the optical center of the lens, the astigmatism axis angle, etc. Therefore, a blocker is provided with an image detection optical system for capturing the image of a lens and a lens meter optical system for measuring the characteristics of the lens (see U.S. Pat. No. 7,884,928). FIG. 1 is views showing the operation of an image detection optical system and a lens meter optical system in a typical blocker. As shown in FIG. 1, when illumination light is emitted from an illumination light source 14 and passes through a lens L, an image sensor 11 located at the rear area of the lens L detects the illumination light, specifically, the shadow of the lens L to thereby obtain an image of the lens. The lens meter 12 detects the position of the illumination light that has passed through the lens L to thereby measure the characteristics of the lens. Here, since the image sensor 11 and the lens meter 12 cannot be located in the rear area of the lens L at the same time, the lens meter 12 is avoided from the rear area of the lens L and only the image sensor 11 is located in the rear area of the lens L when detecting (capturing) an image of the lens (A of FIG. 1). On the other hand, when measuring the characteristics of the lens, the lens meter 12 returns to the rear area of the lens L (B of FIG. 1). The movement of the lens meter 12 is carried out by a step motor 3. As such, if the step motor 3 is used to change the position of the lens meter 12, the structure of the apparatus is complicated and measurement errors are likely to occur.

Meanwhile, U.S. Pat. No. 7,884,928 discloses a blocker that uses a retroreflection member. In the blocker, since an image sensor is placed in a front area of the retroreflection member and a lens meter is placed in a rear area of the retroreflection member, there is no need to move the position the lens meter. However, for measurement of the lens meter, a hole through which the illumination light for the lens meter passes must be formed in the center of the retroreflection member. In the document, a separate retroreflection member for reflecting in part the illumination light passing through the hole is used.

PRIOR ART LITERATURE (Patent Document 1) U.S. Pat. No. 7,884,928
(Patent Document 2) US Patent Application Publication No. 2007/0226991 A1

SUMMARY OF THE INVENTION

Technical Objects

It is an object of the present invention to provide a blocker having a light transmission and reflection device used to detect the image of a lens and to measure the characteristics of the lens.

Technical Solution

In order to achieve the object above, the present invention provides a blocker 10 comprising: an illumination light source 14 configured to emit illumination light that illuminates a lens L; a light transmission and reflection device 20 configured to reflect or transmit the illumination light; an image sensor 11 configured to detect the illumination light reflected by the light transmission and reflection device 20 to thereby obtain an image of the lens L; a lens meter 12 configured to detect the illumination light that has passed through the light transmission and reflection device 20 to thereby measure characteristics of the lens L; and a blocking member 70 configured to attach a leap block B to the lens L, where the light transmission and reflection device 20 comprises: a first reflection plate 41 having a central hole 2 formed in a center thereof; a first rotating cylinder 44 configured to be coupled to the first reflection plate 41 and to rotate the first reflection plate 41; a second rotating cylinder 43 configured to be located inside the first rotating cylinder 44 and to rotate the first rotating cylinder 44; a second reflection plate 42, the position of which is adjusted by the second rotating cylinder 43 and which is configured to open or block the central hole 2 formed in the first reflection plate 41; and driving means 13 configured to drive the second rotating cylinder 43.

Effects of the Invention

The light transmission and reflection device of the present invention can transmit or reflect illumination light as necessary, and the illumination light is more uniformly reflected by the entire area of the retroreflection member when reflecting the illumination light, thereby allowing a uniform image of the lens to be detected.

DETAILED DESCRIPTION OF THE PREFERRED EMBODIMENTS

Figure 1:
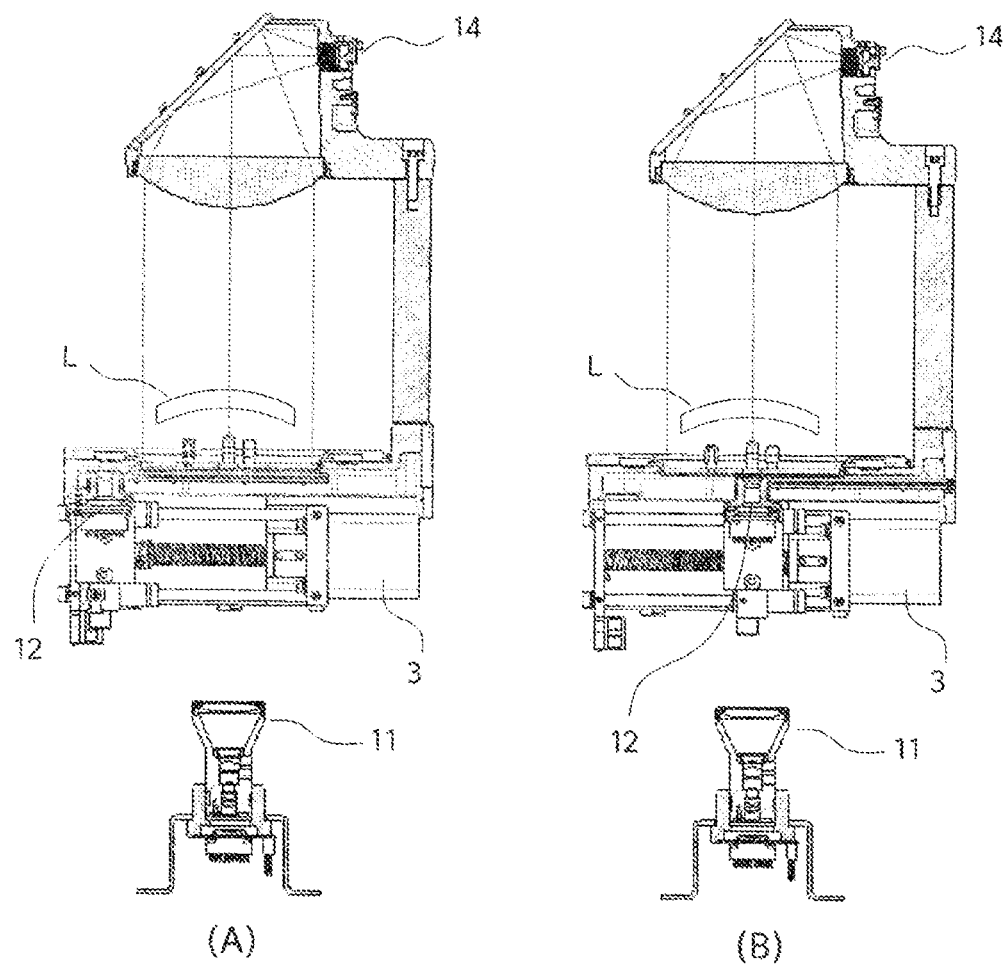
FIG. 1 is views showing the operation of an image detection optical system and a lens meter optical system in a typical blocker.

Hereinafter, the present invention will be described in detail with reference to the accompanying drawings. In the accompanying drawings, like reference numerals are assigned to elements that carry out the same or similar functions as conventional elements.

Figure 2:
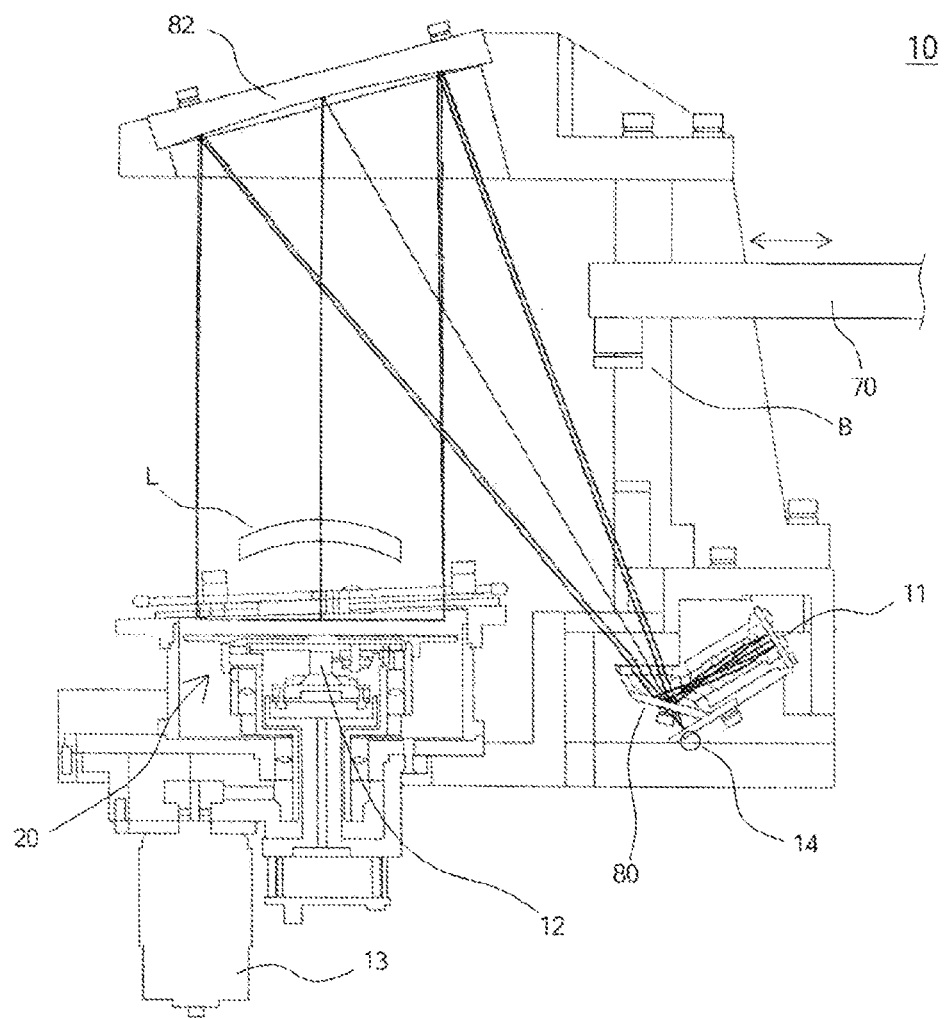
FIG. 2 is a view showing schematically the overall configuration of a blocker in accordance with an embodiment of the present invention.

FIG. 2 is a view showing schematically the overall configuration of a blocker having a light transmission and reflection device in accordance with an embodiment of the present invention. As shown in FIG. 2, the blocker 10 in accordance with an embodiment of the present invention includes an illumination light source 14, a light transmission and reflection device 20, an image sensor 11, a lens meter 12, and a blocking member 70. The illumination light source 14 emits illumination light that illuminates a lens L. The illumination light emitted from the illumination light source 14 passes through a beam splitter 80, is reflected by a concave mirror 82, and is guided to the lens L and the light transmission and reflection device 20. The light transmission and reflection device 20 reflects or transmits the illumination light. If the light transmission and reflection device 20 reflects the illumination light, the illumination light that has passed through the lens L again is reflected by the concave mirror 82 and the beam splitter 80, thereby being detected by the image sensor 11. The image sensor 11 obtains an image of the lens L from the illumination light detected. Accordingly, the illumination light source 14, the light transmission and reflection device 20, the lens L, and the image sensor 11 form an image detection optical system for capturing an image of the lens L. If the light transmission and reflection device 20 transmits the illumination light through a central hole 2 to be described later, the illumination light that has passed through the lens L and the light transmission and reflection device 20 is detected by the lens meter 12. The lens meter 12 detects the position of the illumination light that has passed through the lens L to thereby measure the characteristics of the lens. Accordingly, the illumination light source 14, the lens L, and the lens meter 12 form a lens meter optical system for measuring the characteristics of the lens L. The blocking member 70 is a typical device for attaching a leap block B to the lens L whose characteristics have been measured (see US Patent Application Publication No. 2007/0226991 A1).

Figure 3:
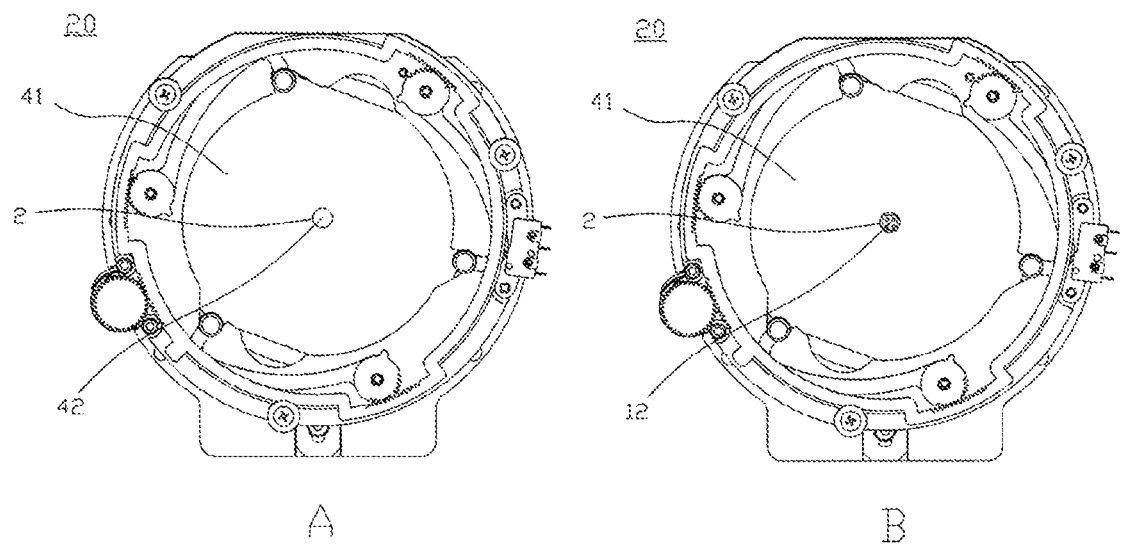
FIGS. 3 and 4 are a plan view and a partially exploded perspective view, respectively, of a light transmission and reflection device 20 in accordance with an embodiment of the present invention.
Figure 4:
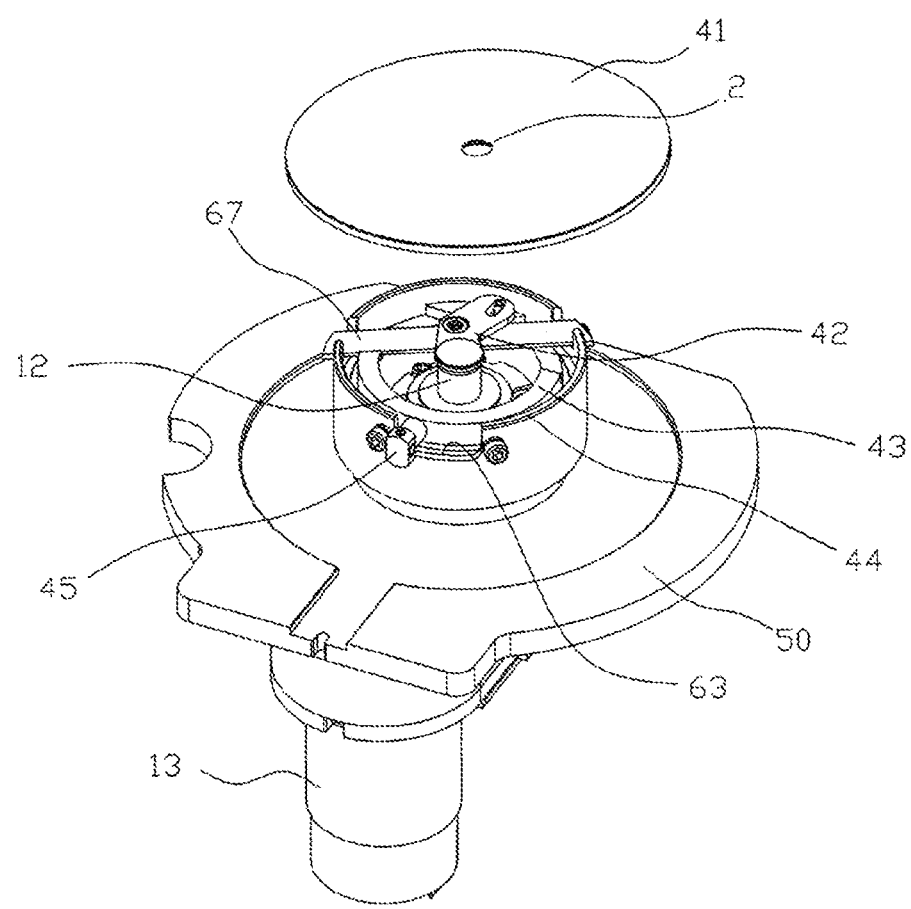

FIGS. 3 and 4 are a plan view and a partially exploded perspective view, respectively, of a light transmission and reflection device 20 in accordance with an embodiment of the present invention. As shown in FIGS. 3 and 4, the light transmission and reflection device 20 in accordance with the present invention includes a first reflection plate 41 having a central hole 2 formed in the center thereof, a first rotating cylinder 44 configured to be coupled to the first reflection plate 41 and to rotate the first reflection plate 41, a second rotating cylinder 43 configured to be located inside the first rotating cylinder 44 and to rotate the first rotating cylinder 44, a second reflection plate 42 whose position is adjusted by the second rotating cylinder 43, and driving means 13 (refer to FIG. 2) for driving the second rotating cylinder 43. The first reflection plate 41 and the second reflection plate 42 may be retroreflection plates that reflect incident illumination light back to the incident direction.

As shown in FIG. 3, in the light transmission and reflection device 20 of the present invention, when detecting the image of the lens L, the central hole 2 formed in the first reflection plate 41 is blocked by the second reflection plate 42, so that the illumination light is reflected by the first reflection plate 41 and the second reflection plate 42 to the entire area of the lens L (A of FIG. 3). If the central hole 2 of the first reflection plate 41 is open when detecting the image of the lens L, the image sensor 11 cannot detect the image of the lens in the area of the central hole 2. The first reflection plate 41 and/or the second reflection plate 42 may have a rotating structure. Although the first reflection plate 41 and/or the second reflection plate 42 may have reflection non-uniformity by which the degree of reflection varies according to the position, if the first reflection plate 41 and/or the second reflection plate 42 rotates at high speed, the reflection non-uniformity according to the position of the first reflection plate 41 and/or the second reflection plate 42 may be prevented, thereby allowing a uniform image of the lens L to be detected. The rotational driving of the first reflection plate 41 and/or the second reflection plate 42 may be carried out by the driving means 13 such as a DC motor.

On the other hand, in the light transmission and reflection device 20 of the present invention, when measuring the characteristics of the lens L, the central hole 2 formed in the center of the first reflection plate 41 is opened (that is, the second reflection plate 42 is avoided), so that the illumination light that has passed through the lens L is introduced into the lens meter 12 through the central hole 2 (B of FIG. 3).

As shown in FIG. 4, the first reflection plate 41 may have a disk shape with the central hole 2 formed in the center thereof, and serves as a main reflection plate that reflects most of the illumination light. The first rotating cylinder 44 is fixedly coupled to the rear side of the first reflection plate 41, and as the first rotating cylinder 44 rotates, the first reflection plate 41 is also caused to rotate therewith. The first rotating cylinder 44 may have a cylindrical structure with a space formed therein, and has an elongated hole 63 extended in the rotational direction of the first rotating cylinder 44 formed on one side.

The second rotating cylinder 43 is located inside the first rotating cylinder 44, may have a cylindrical structure with a space formed therein, and a driving pin 45 protrudes from one side thereof. Since the driving pin 45 is inserted into the elongated hole 63 of the first rotating cylinder 44 and moves within the width of the elongated hole 63, when the second rotating cylinder 43 rotates, the first rotating cylinder 44 also rotates therewith, and when the second rotating cylinder 43 stops, the first rotating cylinder 44 stops therewith. The relative position of the second rotating cylinder 43 with respect to the position of the first rotating cylinder 44 is determined by the width of the elongated hole 63 of the first rotating cylinder 44 into which the driving pin 45 of the second rotating cylinder 43 is inserted. In the internal space of the second rotating cylinder 43, a lens meter 12 is installed at a position corresponding to the central hole 2 of the first reflection plate 41.

The second reflection plate 42 serves as a sub-reflection plate for reflecting the illumination light in the area of the central hole 2 formed in the center of the first reflection plate 41, and has one end rotatably coupled to the first rotating cylinder 44 and another end rotatably coupled to the second rotating cylinder 43, so that the second reflection plate 42 is rotated to thereby block the central hole 2 formed in the center of the first reflection plate 41 or is avoided from the central hole 2 (central hole 2 is opened), depending on the relative position of the second rotating cylinder 43 with respect to the position of the first rotating cylinder 44.

Figure 5:
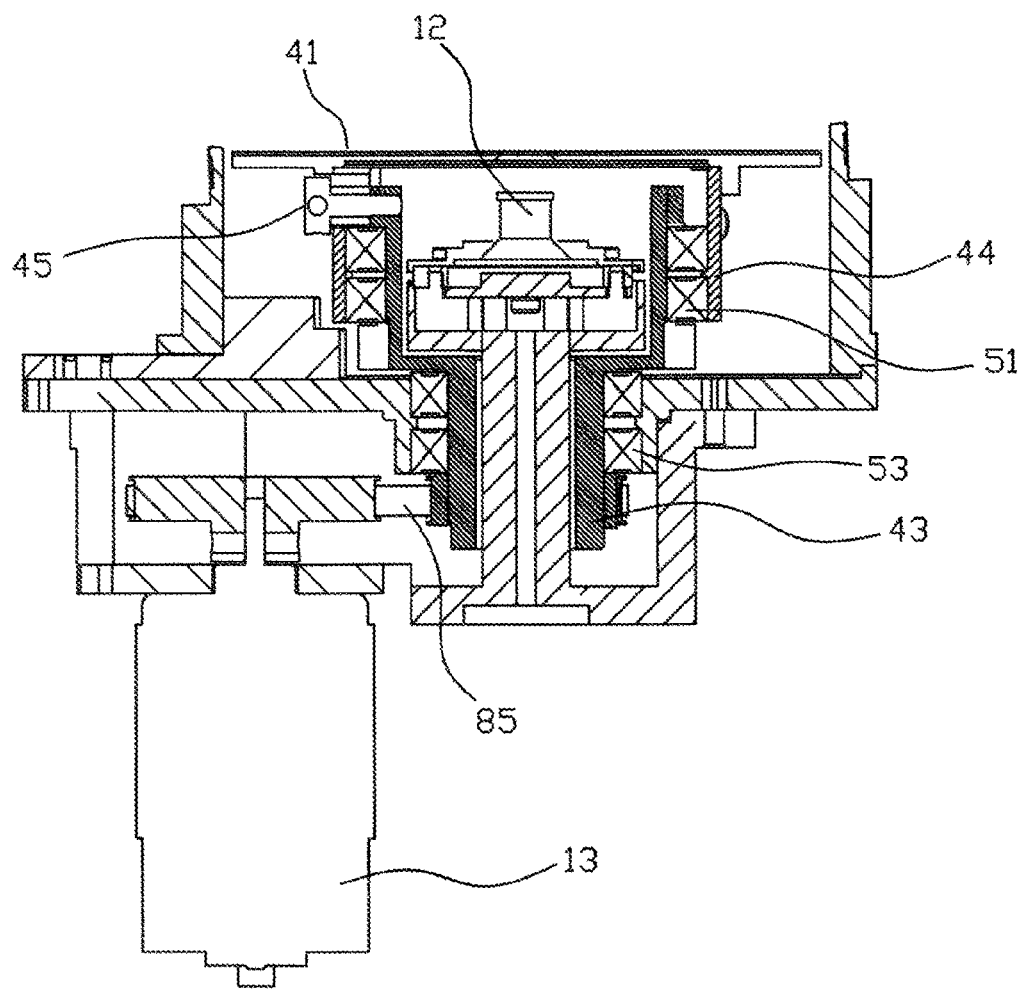
FIG. 5 is a partial cross-sectional view of a light transmission and reflection device 20 in accordance with an embodiment of the present invention.

FIG. 5 is a partial cross-sectional view of a light transmission and reflection device 20 in accordance with an embodiment of the present invention. As shown in FIG. 5, the driving means 13 may rotate the second rotating cylinder 43 via a typical power transmission means such as a belt 85. A bearing 53 is mounted between a blocker frame 50 and the second rotating cylinder 43 and a bearing 51 is also mounted between the second rotating cylinder 43 and the first rotating cylinder 44, so that the driving means 13 may stably rotate the second rotating cylinder 43 and the first rotating cylinder 44.

Figure 6:
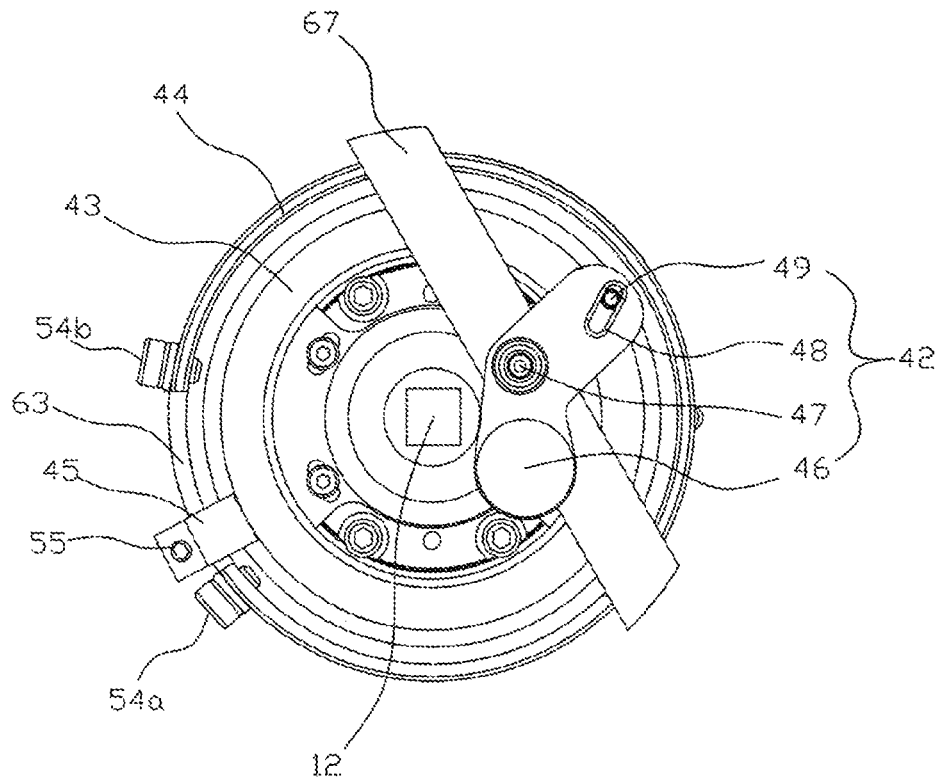
FIGS. 6 and 7 are views for describing the operation of a light transmission and reflection device 20 in accordance with an embodiment of the present invention.
Figure 7:
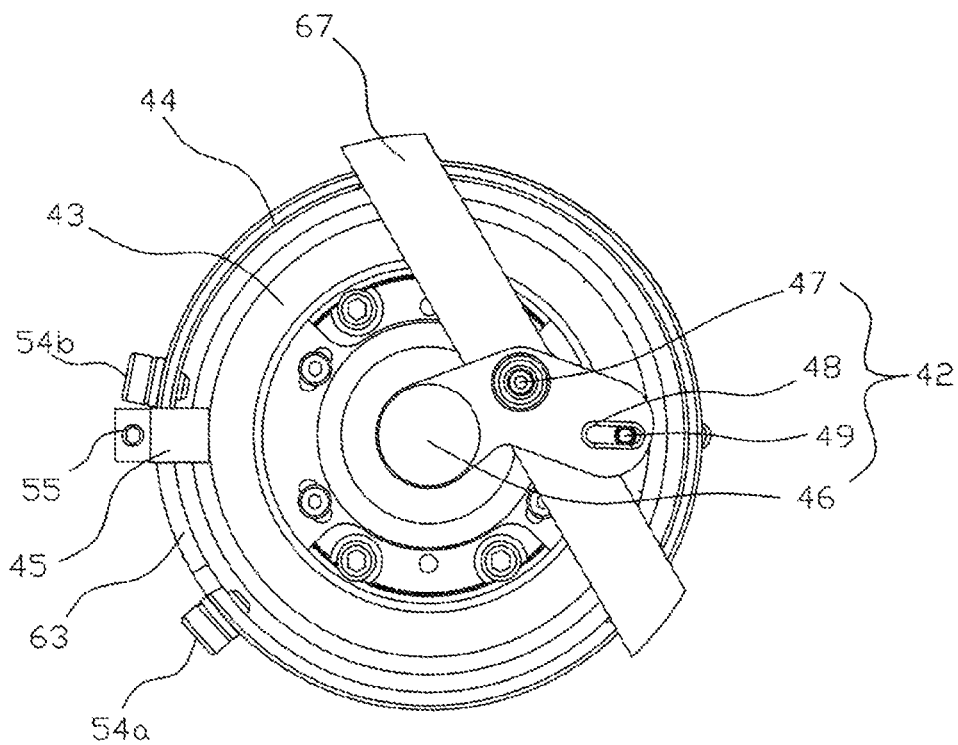

FIGS. 6 and 7 are views for describing the operation of a light transmission and reflection device 20 in accordance with an embodiment of the present invention. As shown in FIGS. 6 and 7, the second reflection plate 42 has, for example, an L-shape, such that one end is rotatably coupled to a connecting member 67 of the first rotating cylinder 44, another end is rotatably coupled to a connecting pin 49 of the second rotating cylinder 43, and at yet another end, a reflective portion 46 for blocking the central hole 2 of the first reflection plate 41 is formed. An elongated hole 48 of a predetermined length is formed at another end of the second reflection plate 42, and the connecting pin 49 of the second rotating cylinder 43 may be inserted into and connected to the elongated hole 48. With such a structure, when the second rotating cylinder 43 rotates while the first rotating cylinder 44 and the connecting member 67 are stationary, the second reflection plate 42 rotates around a rotation shaft 47, which is the position where the second reflection plate 42 and the connecting member 67 are coupled with each other, so that the reflective portion 46 formed at one end of the second reflection plate 42 can block the central hole 2 of the first reflection plate 41. In other words, the second rotating cylinder 43 rotates with respect to the positions of the first rotating cylinder 44 and the connection member 67 that are stationary, so that the second reflection plate 42 can rotate while the connection pin 49 moves within the elongated hole 48 even if the distance between the rotation shaft 47 and the connection pin 49 varies.

Since the first rotating cylinder 44 and the second rotating cylinder 43 are connected by the driving pin 45 of the second rotating cylinder 43 inserted into the elongated hole 63 of the first rotating cylinder 44, the position of the second rotating cylinder 43 relative to the first rotating cylinder 44 depends on the length of the elongated hole 63 formed in the first rotating cylinder 44. As shown in FIG. 6, at the initial position where the second rotating cylinder 43 is stationary, the driving pin 45 of the second rotating cylinder 43 is located at the lower end of the elongated hole 63 formed in the first rotating cylinder 44, and the second reflection plate 42 has deviated from the center of the first rotating cylinder 44, so that the lens meter 12 is open. At this time, the characteristics of the lens can be measured.

On the other hand, if the second rotating cylinder 43 is rotated clockwise, the driving pin 45 of the second rotating cylinder 43 is located at the upper end of the elongated hole 63 formed in the first rotating cylinder 44, and the second reflection plate 42 rotates into the center of the first rotating cylinder 44 to thereby block the lens meter 12, as shown in FIG. 7. The rotation angle of the second reflection plate 42 is the rotation angle of the driving pin 45, which is determined by the length of the elongated hole 63 of the first rotating cylinder 44 and is, for example, 15 to 30 degrees. In this state, if the second rotating cylinder 43 continues to rotate, the driving pin 45 of the second rotating cylinder 43 pushes the first rotating cylinder 44 to cause the first rotating cylinder 44 to rotate with the second rotating cylinder 43. Since the first reflection plate 41 is coupled to and rotates together with the first rotating cylinder 44 and the second reflection plate 42 is coupled to and rotates together with the second rotating cylinder 43 and the first rotating cylinder 44, it is possible to preclude reflection nonuniformity of the first reflection plate 41 and the second reflection plate 42. At this time, the image of the lens can be detected.

After detecting the image of the lens, when the driving means 13 is stopped to thereby cause the second rotating cylinder 43 to be stopped, the first rotating cylinder 44 stops later than the second rotating cylinder 43 since the first rotating cylinder 44 is more outward and heavier than the second rotating cylinder 43 and accordingly has higher rotational moment of inertia. Therefore, the driving pin 45 of the second rotating cylinder 43 is located at the lower end of the elongated hole 63 formed in the first rotating cylinder 44, as shown in FIG. 6.

In this way, when the second rotating cylinder 43 and the first rotating cylinder 44 are stationary or the second rotating cylinder 43 and the first rotating cylinder 44 rotate at a constant rotation speed (no rotational load), the relative positions of the second rotating cylinder 43 and the first rotating cylinder 44 are likely to change even when a small force is applied from the outside. In other words, when the second rotating cylinder 43 is stationary or rotating at a constant rotation speed, the second reflection plate 42 can be easily rotated in an undesired direction. Accordingly, the light transmission and reflection device 20 in accordance with an embodiment of the present invention may be such that the driving pin 45 and both ends of the elongated hole 63 may be coupled with a predetermined magnetic force (i.e., attractive force of magnets). For example, if a first magnetic material 55 is attached to the driving pin 45 and second magnetic materials 54a and 54b are attached to both ends of the elongated hole 63, respectively, it is possible to maintain a state in which the driving pin 45 of the second rotating cylinder 43 is located at the lower end of the elongated hole 63 formed in the first rotating cylinder 44, or the driving pin 45 of the second rotating cylinder 43 is located at the upper end of the elongated hole 63 formed in the first rotating cylinder 44.

The magnetic force between the driving pin 45 and both ends of the elongated hole 63 can prevent the relative positions of the second rotating cylinder 43 and the first rotating cylinder 44 from changing by an unwanted external force, and must have a strength not to interfere with the operation by the rotational driving of the second rotating cylinder 43 and the first rotating cylinder 44.

In the blocker of the present invention, when the second rotating cylinder 43, which is connected to the driving means 13 by the belt 85 or the like and directly receives torque, is rotated, the driving pin 45 fixed to the second rotating cylinder 43 is caught by one side of the elongated hole 63 of the first rotating cylinder 44 to cause the second rotating cylinder 43 and the first rotating cylinder 44 to rotate together, and at this time, the second reflection plate 42 is also rotated, so that the reflective portion 46 of the second reflection plate 42 blocks the central hole 2 of the first reflection plate 41. Thereafter, when the driving means 13 is stopped to thereby stop the second rotating cylinder 43, the first rotating cylinder 44 having a relatively higher rotational moment of inertia rotates a little further, so that the driving pin 45 of the second rotating cylinder 43 is located at the lower end of the elongated hole 63 of the first rotating cylinder 44, and the second reflection plate 42 opens the central hole 2 of the first reflection plate 41.

Although the structure and operation of the device in accordance with the present invention has been described above with reference to specific embodiments, the present invention is not limited to the specific embodiments described above and various modifications are possible within the scope set forth in the following claims.

The invention claimed is:

1. A blocker (10) comprising:
   an illumination light source (14) configured to emit illumination light that illuminates a lens (L);
   a light transmission and reflection device (20) configured to reflect or transmit the illumination light;
   an image sensor (11) configured to detect the illumination light reflected by the light transmission and reflection device (20) to thereby obtain an image of the lens (L);
   a lens meter (12) configured to detect the illumination light that has passed through the light transmission and reflection device (20) to thereby measure characteristics of the lens (L); and
   a blocking member (70) configured to attach a leap block (B) to the lens (L),
   wherein the light transmission and reflection device (20) comprises: a first reflection plate (41) having a central hole (2) formed in a center thereof; a first rotating cylinder (44) configured to be coupled to the first reflection plate (41) and to rotate the first reflection plate (41); a second rotating cylinder (43) configured to be located inside the first rotating cylinder (44) and to rotate the first rotating cylinder (44); a second reflection plate (42), the position of which is adjusted by the second rotating cylinder (43) and which is configured to open or block the central hole (2) formed in the first reflection plate (41); and driving means (13) configured to drive the second rotating cylinder (43).

2. The blocker (10) of claim 1, wherein the first reflection plate (41) and the second reflection plate (42) are retroreflection plates that reflect incident illumination light back to an incident direction.

3. The blocker (10) of claim 1, wherein when detecting the image of the lens (L), the central hole (2) formed in the first reflection plate (41) is blocked by the second reflection plate (42), so that the illumination light is reflected by the first reflection plate (41) and the second reflection plate (42) to an entire area of the lens (L), and
   when measuring the characteristics of the lens (L), the central hole (2) formed in the center of the first reflection plate (41) is opened, so that the illumination light that has passed through the lens (L) is introduced into the lens meter (12) through the central hole (2).

4. The blocker (10) of claim 1, wherein an elongated hole (63) extending in a rotational direction of the first rotating cylinder (44) is formed on one side of the first rotating cylinder (44), a driving pin (45) protrudes from one side of the second rotating cylinder (43), and the driving pin (45) is inserted into the elongated hole (63) of the first rotating cylinder (44) and moves within a width of the elongated hole (63).

5. The blocker (10) of claim 4, wherein the driving pin (45) and both ends of the elongated hole (63) are coupled with a predetermined magnetic force.

6. The blocker (10) of claim 1, wherein the second reflection plate (42) has one end rotatably coupled to the first rotating cylinder (44) and another end rotatably coupled to the second rotating cylinder (43), so that the second reflection plate (42) is rotated to thereby block the central hole (2) formed in the first reflection plate (41) or is avoided from the central hole (2), depending on a relative position of the second rotating cylinder (43) with respect to a position of the first rotating cylinder (44).

\* \* \* \* \*